UNITED STATES PATENT OFFICE.

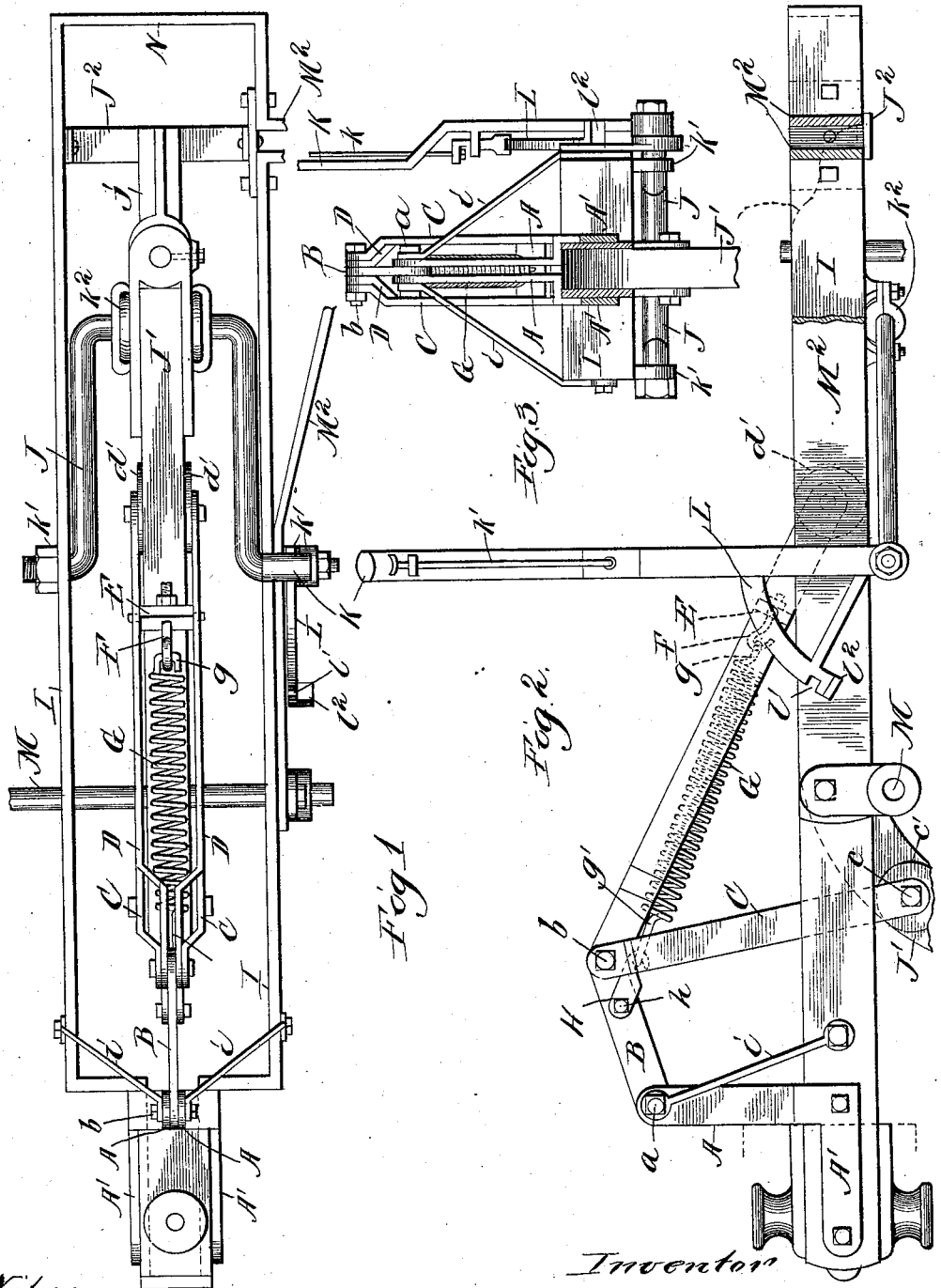

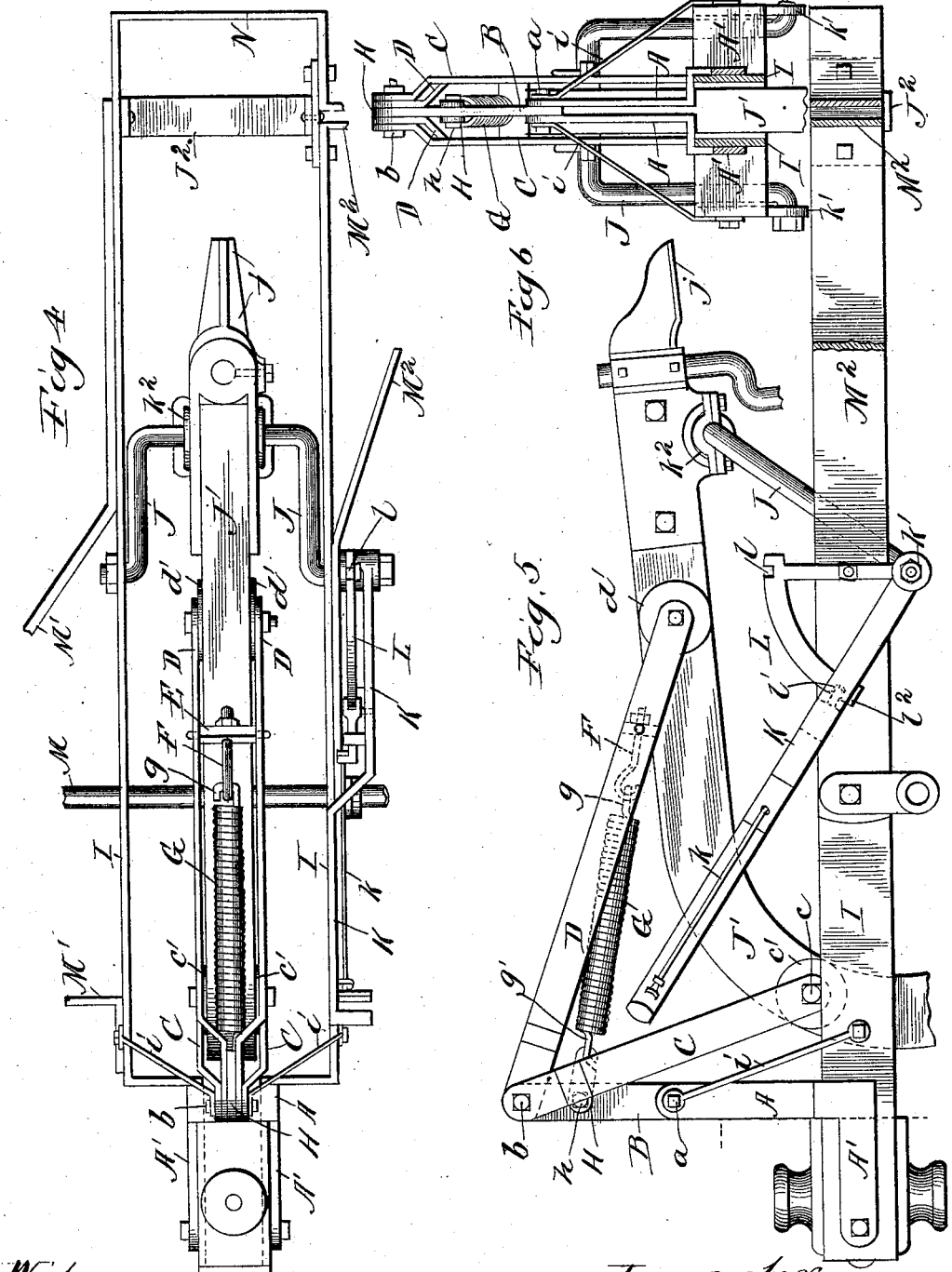

WILLIAM T. M. BRUNNEMER, OF BRADLEY, ILLINOIS, ASSIGNOR TO THE DAVID BRADLEY MANUFACTURING COMPANY, OF SAME PLACE.

WHEELED PLOW.

SPECIFICATION forming part of Letters Patent No. 595,521, dated December 14, 1897.

Application filed November 27, 1896. Serial No. 613,570. (No model.)

*To all whom it may concern:*

Be it known that I, WILLIAM T. M. BRUNNEMER, a citizen of the United States, residing at Bradley, in the county of Kankakee and State of Illinois, have invented certain new and useful Improvements in Wheeled Plows, of which the following is a specification, reference being had to the accompanying drawings, in which—

Figure 1 is a top or plan view of the framework and parts containing the improvements. Fig. 2 is a side elevation showing the position of the lifting devices when the plow-beam is down. Fig. 3 is a rear elevation of the same, partly in section. Fig. 4 is a top or plan view of the same parts when the plow-beam is elevated. Fig. 5 is a side elevation showing the parts raised. Fig. 6 is a rear elevation, partly in section, also showing the parts raised.

The plow shown is of the class usually known as "sulky-plows"—that is, a plow-beam carrying a single plow. It will be understood that the usual land and furrow wheels are to be attached by any ordinary or suitable means. The improvement is equally adapted for use with gang-plows having a single beam with two or more plows or two or more beams with lifting-levers and springs placed between them.

The objects of the invention are, first, to provide improved spring lifting mechanism for plows, cultivators, and other implements, and, second, to provide means for limiting or preventing the downward inclination of the furrow-opener when in operative position. The nature of the invention, so far as the lifting mechanism is concerned, consists in giving the spring a short range of contraction or expansion by a system of levers and connections, causing the spring to travel bodily with the lifting devices in its contraction or expansion; also, in providing a lifting device for agricultural implements and for such other purposes as it may be adapted to consisting of two pivotally-connected members, one suitably fulcrumed and the other arranged at an angle thereto, together with a spring which acts to move said members to change their relative angular position, so that the device to be lifted, being connected with one of said members, may be adjusted vertically by moving the members to change their angular position.

My invention further consists in providing the machine-frame with means coöperating with the furrow-opener-carrying device or beam to prevent downward motion of the beam, so as to limit or prevent the downward inclination of the furrow-opener when it is in operative position, and, more specifically, in providing the frame with a rigid stop which intercepts the beam and prevents downward movement thereof when the furrow-opener is in operative position.

In the drawings, A indicates fixed standards or uprights which carry the fulcrum for the lifting-lever. The uprights, as shown, consist of two standards A, having extensions A' attached to the rear extension of the frame, which rear extension is adapted to carry a caster-wheel or a fixed landside-wheel. They are also supported at their upper ends by braces $i$, which, as shown, are attached to the pivot-bolt $a$ and to the side bars of the frame I, so as to give them a steady position for supporting the lifting-lever B, which is pivoted to the standards. The lifting-lever B extends forwardly, and attached thereto is the hook H, by the pivot $h$, by which the rear end of the spring is attached to the lever. It also carries two sets of links C and D. The links C in operation raise and lower the rear end of the plow-beam or plow proper, while the links D extend forward for the purpose of lifting the front end of the beam, as shown. The lower ends of the links C are attached to the plow-beam J' by a bolt $c$, which bolt, in the form shown, passes through face-plates $c'$, which plates are preferable to use where the plow-beam is of iron and of the I-beam form. In other forms of beam these face-plates $c'$ and also the face-plates $d'$ at the attaching-point of the links D may be omitted. The links C and D are attached to the lever B by the same pivot-bolt $b$, and the links D pass forward, as shown, and are connected with the plow-beam J' sufficiently near its front end to raise and otherwise control the lifting of the front end of the plow-beam. In the form shown the links C and D are placed one on each side of the plow-beam. In rear of the connection of the links D with the plow-beam there is located a bar or plate E, which may turn on pivots or trunnions with the spring G as the rear end of said spring is raised or lowered relatively to the frame. Passing through said bar E is a short rod having a hook on its rear end and an adjusting screw and nut at its forward end, by means of which the tension of the spring may be regulated. The spring is attached to the hooks F and H by loops or hooks $g$ $g'$, so as to connect the lower or front end of the spring G with the links D and the rear end with the lever B at the pivot-pin $h$. In making these connections I have used two standards A, two links C, and two links D; but it will readily be seen that a single standard and single links will be operative, and especially so by connecting the single link C with the single link D to opposite sides of the plow-beam. The duplication shown, however, gives the parts a somewhat steadier connection than would be obtained with single parts. In the form shown the frame I is made of iron and is designed to be supported on three wheels (not shown) located by suitable means at M and held in place by the axle-braces M' and $M^2$ for the land and furrow wheels. The rear wheel is held in the rear extension of the frame. The frame may be made of iron or of wood, as is most convenient, and may be varied in form to adapt it to a different arrangement of wheels. In the form shown a steering-pole is used with the draft on the frame at N, by which construction the front end of the beam is relieved of the weight of the draft devices, and consequently the plow may be much more readily lifted when desired, as the lifting of the beam does not involve the lifting of such devices.

The descent of the front end of the beam beyond a fixed point is prevented by a fixed cross-bar $J^2$, which is secured to the frame in position to intercept a front plate or lug $j$, carried by the plow-beam, the arrangement being such that when the plow-beam has been lowered to the proper position said lug $j$ will rest upon the cross-bar $J^2$, making it impossible for the front end of the beam to descend farther.

K is a lifting-lever provided with a rod $k$ and a suitable catch to engage with the notches $l$ $l'$ of the sector or segmental rack L. The lower end of this lever K is carried forward and bent so as to form a bail J, which projects sufficiently far forward to lift the front end of the beam to the desired elevation. This bail or crank projection of the lever may be made by bending the lever at an angle, as shown, or it may be a separate piece to which the lever is attached. This lever, with its bail or crank, is attached to the frame I at $k'$ and to the plow-beam at $k^2$, as shown.

The sector L is attached to the frame I in any suitable manner, and it may be provided with any number of notches to hold the lever K in any desired position; but ordinarily the limit-notches $l$ $l'$ will be sufficient, as intermediate stops are not essential. The sector is provided at its lower or rear end with a limit-stop $l^2$, which prevents the lever K from turning too far when moved backward.

The lever K when locked in its forward position serves to lock the front end of the plow-beam down upon the stop $J^2$, thereby in effect locking the beam and frame together, downward movement of the front end of the beam being prevented by the stop $J^2$ and upward movement thereof by the locking device of the lever K.

By attaching an upper limit for the front end of the plow-beam and attaching the links D farther back on the beam the rear links C may be omitted in light sulky-plows, but for heavy ones and for gang-plows these rear links will usually be required.

In operation for plowing the hand-lever will be in the vertical position shown at Fig. 2, when the pole will be at its lowest point. By turning the lever backward to the position shown in Fig. 5 the plow will be at the highest limit permitted by the stop $l^2$. The attachment of this lifting-lever at the front end starts the lifting at this point, so that the motion of the team will aid in running the plow out of the ground by inclining its point upward, and as the plow moves backward in lifting it can be easily raised out of the ground when the team is not moving.

The connection of the spring G with the links D and with the lever B at a point in rear of the link connection causes the contraction of the spring to aid in lifting, and as in lifting the plow the forward end of the lever B is also lifted the links C lift the rear end of the plow and bring the parts nearly in line, as shown in Fig. 5. The elevation to a vertical or practically vertical position of the lever B lifts the plow, and in this position it is held without any special strain on the sector connection of the lever K, and as the spring moves backward with the links D a short range of spring action is obtained, so that a strong spring can be used with a limited amount of contraction and expansion of the spring itself, as it will be noted that the expansion or contraction of the spring-coils is very much less than would be required if the spring were so connected that its expansion and contraction would be equal to the distance moved by the plow-beam J'. The distance which the plow-beam moves upward is equal to the upward movement of the lever B, while the extension of the spring is equal to the difference in the movement between the pivots $h$ and $b$. This arrangement of the parts causes an easy movement for raising or lowering the plow, which is under the perfect control of the operator, so that it can be operated by a boy.

It will be obvious that by changing the connection of the links D to the pivot $h$ and that of the spring G to the pivot $b$ the expansion of a compressed spring may be used when attachments adapted to this change are employed; also, that the fixed fulcrum, lifting-lever, connecting-links, beam or bar, and a bodily-moving spring may be usefully employed in other situations and for other lifting purposes.

I have described my invention in detail in order to make clear the construction illustrated; but I wish it to be understood that I do not restrict myself to the specific details of construction illustrated, except as specifically claimed, as various modifications may be made without departing from the spirit of my invention. For instance, in the drawings I have shown the lifting-spring as connected to the links D. This arrangement may, however, be varied, provided the arrangement be such that the lifting-spring will act to move the link or links and lever B or the parts equivalent thereto in such manner as to change their angular position, and thereby exert a lifting effect.

In the drawings I have shown only enough of the beam which carries the plowshare or other furrow-opener to fully illustrate the construction and operation of my improvements, and it is to be understood that the furrow-opener is preferably carried thereby in any of the usual well-known ways.

That which I claim as my invention, and desire to secure by Letters Patent, is—

1. A lifting device consisting of two rigid members pivotally connected together, a support for one of said members, and a spring acting to move said members to change their relative angular position, substantially as described.

2. A lifting device consisting of two pivotally-connected members, one suitably fulcrumed and the other connected to the object to be lifted and a spring acting to move said members to change their relative angular position, substantially as described.

3. The combination with a machine-frame, and a furrow-opener beam, of a member pivotally supported on said frame, a member pivoted to the first member and connected with the furrow-opener beam, and a spring which acts to move said members to change their relative angular position, substantially as described.

4. The combination, in a plow, of a machine-frame, a furrow-opener pivotally carried by said frame, means for preventing downward inclination of the furrow-opener, and separate means for holding the furrow-opener down in operative position, substantially as described.

5. The combination, in a plow, of a machine-frame, a beam carried by said frame, a furrow-opener carried by said beam, a limit-stop carried by the frame and acting to prevent downward inclination of the furrow-opener, and means for locking the furrow-opener beam to said stop, substantially as described.

6. The combination, in a plow, of a machine-frame, a beam pivotally supported by said frame, a plow carried by said beam, a rigid stop carried by the frame, and means for holding the plow-beam down upon said stop, substantially as described.

7. The combination, in a plow, of a machine-frame adapted to be connected to the draft device, a furrow-opener connected to said frame, the draft being transmitted through the frame to the furrow-opener, means for lifting the furrow-opener, and means independent of the lifting mechanism for preventing downward inclination of the furrow-opener, substantially as described.

8. The combination, in a plow, of a machine-frame, adapted to be connected to the draft device, a plow-beam pivotally supported by said frame, the draft being transmitted through said machine-frame to said plow-beam, means for lifting the plow and beam, and a stop independent of the lifting mechanism for preventing downward motion of the front end of the plow-beam, substantially as described.

9. The combination, in a plow, of a frame, a draft device connected to the frame, a furrow-opener, a beam carrying the furrow-opener and pivotally mounted upon the frame, means for raising and lowering the furrow-opener, and means for rigidly locking the beam and the frame together when the furrow-opener is in operative position, whereby downward inclination thereof is limited and the draft is transmitted thereto through the frame and beam, substantially as described.

10. In a wheeled plow, the combination of a fulcrum-post, a lifting-lever pivoted thereon, forward and rearward lifting-links pivoted at a common pivot to the lifting-lever, a lifting-spring connected at its forward end with the forward lifting-links and at its rear end to the lifting-lever, and a plow-beam pivotally connected with the lifting-links, substantially as described.

11. In a wheeled plow, the combination of a lifting-lever pivotally mounted on a fulcrum-post, front and rear lifting-links pivotally connected to the lifting-lever, a spring connected with the forward lifting-links by a pivot block or bar and at its rear end to the lifting-lever by a pivoted connection, a plow-beam pivotally connected to the lifting-links, and a hand-lever connected with the beam and frame, substantially as described.

12. In a wheeled plow, the combination of a fulcrum-post, a lifting-lever pivotally mounted thereon, front and rear lifting-links pivotally connected with the lifting-lever and with the plow-beam, a spring connected at its forward end with the forward lifting-links and at its rear end with the lifting-lever, a hand-lever attached to the frame and provided with a crank or bail connected with the plow-beam, the sector L provided with engaging notches for the latch, and a limit-stop for limiting the backward movement of the lever, substantially as described.

13. In a wheeled plow, the combination of a fulcrum-post, a lifting-lever pivotally mounted thereon, front and rear lifting-links pivotally connected with the lifting-lever and with the plow-beam, a spring connected at its forward end with the forward lifting-links and at its rear end with the lifting-lever, a hand-lever attached to the frame and provided with a crank or bail connected with the plow-beam, the sector L provided with engaging notches for the latch, a limit-stop for limiting the backward movement of the lever, and a limit-stop for limiting the downward movement of the plow-beam, substantially as described.

14. In a wheeled plow, the combination of a lifting-lever pivotally mounted on the frame of said plow, lifting-links pivotally connected with the lifting-lever and the plow-beam, and a spring connected with the forward lifting-links and with the lifting-lever, said spring moving with the forward lifting-links giving the spring a less movement than that of said links in raising or lowering the plow-beam, substantially as described.

15. In a wheeled plow, the combination of a fulcrum-post, a lifting-lever, a spring connected with said lever in rear of the link-pivot, links, as D, with the spring attached thereto, whereby during the movement of the parts the spring moves bodily a less distance than the movement of said links, substantially as described.

16. As an improved lifting device, the combination of a fixed fulcrum, and lifting-lever, with one or more pivoted links, a bodily-moving spring having a shorter limit of travel than the link or links, and a weight-lifting beam or bar, whereby a short contraction or expansion of the spring is obtained, substantially as described.

17. The combination with a supporting-frame and an object to be lifted, of a lifting device consisting of two pivotally-connected members, the first suitably pivoted upon the frame and the second connected with the object to be lifted, and a spring which acts to change the angular position of said first member with reference to the frame and to the second member, substantially as described.

18. The combination with a supporting-frame, an object to be lifted and a rocking support for the object to be lifted, of a lifting device consisting of two pivotally-connected members, the first suitably pivoted upon the frame and the second connected with the object to be lifted, and a spring which acts to change the angular position of said first member with reference to the frame and to the second member, substantially as described.

19. The combination with a supporting-frame, an object to be lifted, a rocking support for the object to be lifted and a lever for rocking said support, of a lifting device consisting of two pivotally-connected members, the first suitably pivoted upon the frame and the second connected with the object to be lifted, and a spring which acts to change the angular position of said first member with reference to the frame and to the second member, substantially as described.

20. The combination with a supporting-frame, a plow-beam, of a lifting device consisting of a lever H, one or more links D connected to said lever and to the plow-beam, a crank supporting the plow-beam on the frame and a spring connected to the lever H and with the links D, substantially as described.

21. The combination with a frame, a furrow-opener beam supported thereby, of a rigid stop carried by the frame in position to intercept the front portion of the beam when the furrow-opener is in operative position, substantially as described.

22. The combination with a frame and a furrow-opener beam, of a crank supporting said beam on said frame, the front end of the beam extending forward of said crank and a rigid stop carried by the frame in position to intercept the front end of the beam, substantially as described.

23. The combination with a frame having a stop $J^2$, of a furrow-opener beam having a projecting end $j$ and means for raising and lowering the beam, substantially as described.

24. The combination with a frame having a stop $J^2$, of a furrow-opener beam having a projecting end $j$, a crank J upon which the beam is mounted and means for raising and lowering the beam, substantially as described.

25. The combination in a plow, of a machine-frame, a plow-beam supported by said frame and a rigid stop carried by the frame and adapted to intercept a portion of the plow-beam to limit the downward inclination of the plow, substantially as described.

WILLIAM T. M. BRUNNEMER.

Witnesses:
 GEO. C. MORGAN, Jr.,
 B. HARLEY BRADLEY.